United States Patent
Kim et al.

(10) Patent No.: US 11,310,395 B2
(45) Date of Patent: Apr. 19, 2022

(54) IMAGE FORMING APPARATUS PERFORMING COLOR REVISION USING COLOR RECOGNITION INFORMATION OF A USER

(71) Applicant: Hewlett-Packard Development Company, L.P., Spring, TX (US)

(72) Inventors: Jung-Hun Kim, Seongnam-si (KR); Sangmi Kim, Seongnam-si (KR); Sejong Kim, Seongnam-si (KR); Hyein Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/279,766

(22) PCT Filed: Aug. 12, 2019

(86) PCT No.: PCT/US2019/046115
§ 371 (c)(1),
(2) Date: Mar. 25, 2021

(87) PCT Pub. No.: WO2020/180345
PCT Pub. Date: Sep. 10, 2020

(65) Prior Publication Data
US 2021/0337086 A1    Oct. 28, 2021

(30) Foreign Application Priority Data

Mar. 7, 2019  (KR) .................. 10-2019-0026365

(51) Int. Cl.
*H04N 1/60* (2006.01)
*G06F 3/12* (2006.01)
*G06V 10/56* (2022.01)

(52) U.S. Cl.
CPC ......... *H04N 1/6027* (2013.01); *G06F 3/1208* (2013.01); *G06F 3/1247* (2013.01);
(Continued)

(58) Field of Classification Search
CPC ...... H04N 1/2338; H04N 1/21; H04N 1/6075; G06K 9/00
See application file for complete search history.

(56) References Cited

U.S. PATENT DOCUMENTS 7,598,964 B2  10/2009  Olson
8,798,317 B2   8/2014  Wu
(Continued)

FOREIGN PATENT DOCUMENTS

JP  2010-191771 A   9/2010
JP  2011-126041 A   6/2011
(Continued)

*Primary Examiner* — King Y Poon
*Assistant Examiner* — Michael Burleson
(74) *Attorney, Agent, or Firm* — Jefferson IP Law, LLP

(57) ABSTRACT

An example image forming apparatus includes a communication device to receive print data, a print engine to form an image, a memory to store information on a saturation that allows to recognition of a predetermined hue for each user, and a processor to identify a user corresponding to the received print data, and control the print engine to print the received print data based on saturation information of the identified user.

15 Claims, 15 Drawing Sheets

(52) U.S. Cl.
CPC .......... *G06F 3/1257* (2013.01); *G06F 3/1258* (2013.01); *G06V 10/56* (2022.01); *H04N 1/6008* (2013.01); *H04N 1/6075* (2013.01)

(56) References Cited

U.S. PATENT DOCUMENTS

| | | |
|---|---|---|
| 2004/0027594 A1 | 2/2004 | Suzuki et al. |
| 2004/0212815 A1 | 10/2004 | Heeman et al. |
| 2004/0227964 A1* | 11/2004 | Fujino .................... H04N 1/622 358/1.9 |
| 2011/0229023 A1* | 9/2011 | Jones ........................ G06T 5/00 382/162 |
| 2013/0201496 A1* | 8/2013 | Boggs ................. G09B 21/008 358/1.9 |

FOREIGN PATENT DOCUMENTS

| | | |
|---|---|---|
| JP | 2014-11612 A | 1/2014 |
| JP | 2014-78076 A | 5/2014 |

\* cited by examiner

FIG. 7

| ID | Red | Green | Blue | Eyesight | Model | Color Table |
|---|---|---|---|---|---|---|
| User A | 100 | 100 | 50 | 1.0 | Model A | 5502 |
| User B | 100 | 10 | 100 | 0.7 | Model B | 9095 |
| User C | 70 | 100 | 100 | 0.8 | Model B | 0334 |
| User D | 50 | 50 | 50 | 1.0 | Model A | 5552 |

FIG. 8

| Color Table | C | M | Y | K | R | G | B | Eyesight |
|---|---|---|---|---|---|---|---|---|
| 0000 | 0 | 0 | 0 | 0 | 100 | 100 | 100 | 1.5 |
| 0001 | 0 | 0 | 0 | 1 | 100 | 100 | 100 | 1.2 |
| 0002 | 0 | 0 | 0 | 2 | 100 | 100 | 100 | 1 |
| 9997 | 9 | 9 | 9 | 7 | 10 | 10 | 10 | 0.5 |
| 9998 | 9 | 9 | 9 | 8 | 10 | 10 | 10 | 0.3 |
| 9999 | 9 | 9 | 9 | 9 | 10 | 10 | 10 | 0.1 |

IMAGE FORMING APPARATUS PERFORMING COLOR REVISION USING COLOR RECOGNITION INFORMATION OF A USER

BACKGROUND

An image forming apparatus is an apparatus for generating, printing, receiving, or transmitting print data. Representative examples of an image forming apparatus include a printer, a copier, a scanner, a facsimile, and a multifunction peripheral (MFP) that integrally implements these functions.

An image forming apparatus may receive print data from an external device and perform printing. The image forming apparatus may correct a color of print data prior to performing printing, and perform printing using the corrected print data.

BRIEF DESCRIPTION OF THE DRAWINGS

FIG. 7 is a view illustrating saturation information on a predetermined hue for each user according to an example;

FIG. 8 is a view illustrating color table information according to an example;

DETAILED DESCRIPTION

Hereinafter, various examples of the disclosure will be described with reference to the accompanying drawings. The examples to be described below may also be modified in various forms. In order to more clearly describe features of the examples, a description of matters which are well known to those skilled in the art to which the examples pertain will be omitted.

In the specification, a case in which a component is "connected" with another component includes a case in which the component is directly connected to the other component and a case in which the component is connected to the other component while having another component interposed therebetween. In addition, a case in which a component "comprises" another component means that the component may further comprise other components, and not exclude other components, unless explicitly described to the contrary.

The expression "image forming job" as used herein may refer to various jobs related with an image, such as, formation of an image or generation/storage/transmission of image files (e.g., printing, copying, scanning, or faxing), and the expression "job" as used herein may refer to not only the image forming job, but also a series of processes required for performance of the image forming job.

In addition, an "image forming apparatus" may refer to a device for printing print data generated from a terminal such as a computer on a recoding paper. Examples of an image forming apparatus described above may include a copier, a printer, a scanner, a facsimile, a multi-function printer (MFP) for complexly implementing functions thereof through a single device, and the like. The image forming apparatus may refer to any device capable of performing an image forming task, such as the copier, the printer, the scanner, the facsimile, the multi-function printer (MFP), or a display.

The expression "content" as used herein may refer to any type of data as a subject of the image forming job, such as a picture, an image, a document file, or the like.

The expression "printing data" as used herein may refer to data converted into a format that can be printed at the printer. When the printer supports direct printing, the file itself may be the printing data.

The expression "user" as used herein may refer to a person who performs a manipulation related with the image forming job using the image forming apparatus or a device connected to the image forming apparatus in a wired or wireless manner. Further, the expression "manager" as used herein may refer to a person who has an authority to access all the functions and systems of the image forming apparatus. The "manager" and the "user" may refer to the same person.

Figure 1:
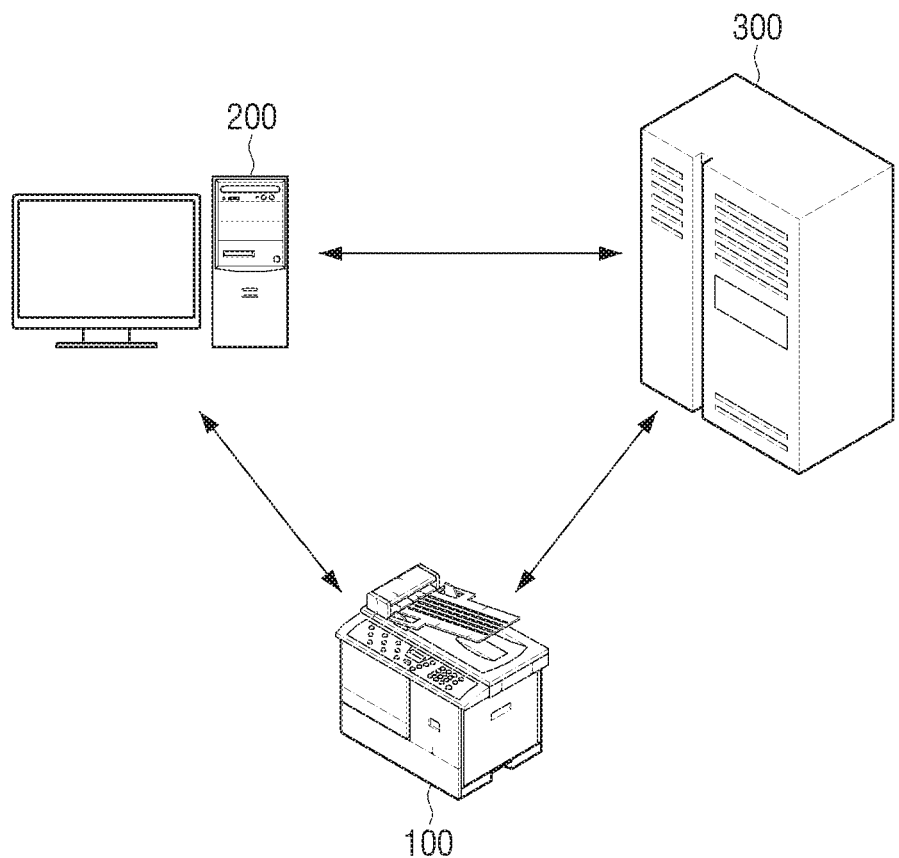
FIG. 1 is a block diagram of an image forming system according to an example.

FIG. 1 is a block diagram of an image forming system according to an example.

Referring to FIG. 1, an image forming system 1000 may include an image forming apparatus 100, an electronic apparatus 200, and a server 300.

The image forming apparatus 100 may receive print data and user information from the electronic apparatus 200.

The image forming apparatus 100 may correct color of the received print data. The image forming apparatus 100 may correct color of the received print data using saturation information for a predetermined hue of a user corresponding to the received user information. The saturation information of the predetermined hue may be information on a saturation at which the user can recognize the hue in the case where the predetermined hue has each of a plurality of saturations.

The image forming apparatus 100 may correct a cyan, magenta, yellow, black (CMYK) value of print data so that the predetermined hue of the received print data may have the saturation that can be recognized by the identified user using the saturation information on the predetermined hue.

Although the image forming apparatus 100 may not store the saturation information on the predetermined hue, correction of the print data may be performed.

The image forming apparatus 100 may transmit the received user information to the server 300, receive correction information corresponding to the user information from the server, and correct the color of print data using the received correction information. The correction information may include a correction value for each CMYK color.

The image forming apparatus 100 may print the corrected print data.

In an example, the color correction of the print data could may be performed by the electronic apparatus 200, rather than the image forming apparatus 100.

The electronic apparatus 200 may perform a color vision test for a user. As an example, the electronic apparatus 200 may test, using a color vision application, whether a user can recognize a predetermined hue, and whether the user can recognize the predetermined hue with a plurality of saturations ranging from a lowest saturation to a highest saturation. Various examples will be described with reference to FIG. 5, FIG. 6A and FIG. 6B.

The electronic apparatus 200 may transmit a color vision test result to the server 300, and receive correction information corresponding to the color vision test result from the server 300. The electronic apparatus 200 may correct print data using the received correction information.

The electronic apparatus 200 may transmit the corrected print data to the image forming apparatus 100.

The server 300 may receive the user information and the color vision test result from the electronic apparatus 200, and generate saturation information on a predetermined hue using the received color vision test result.

The server 300 may generate correction information including a CMYK correction value using saturation information on the predetermined hue. As an example, the server 300 may generate correction information including the CMYK correction value that changes the CMYK value so that the predetermined hue may have a saturation at which the user can recognize the predetermined hue.

When receiving the user information from the image forming apparatus 100, the server 300 may transit correction information corresponding to the received user information to the image forming apparatus 100.

FIG. 1 illustrates and describes that the image forming system 1000 includes the electronic apparatus 200 and the server 300, but in other examples, at least one of the electronic apparatus 200 or the server 300 may be omitted.

As an example, if the image forming apparatus 100 performs a color vision test instead of the electronic apparatus 200, the electronic apparatus 200 may be omitted. As an example, if the image forming apparatus 100 or the electronic apparatus 200 generates correction information directly using the color vision test result, the server 300 may be omitted. As an example, if the image forming apparatus 100 performs the color vision test, and generates the correction information using the color vision test result, the electronic apparatus 200 and the server 300 may be omitted.

Figure 2:
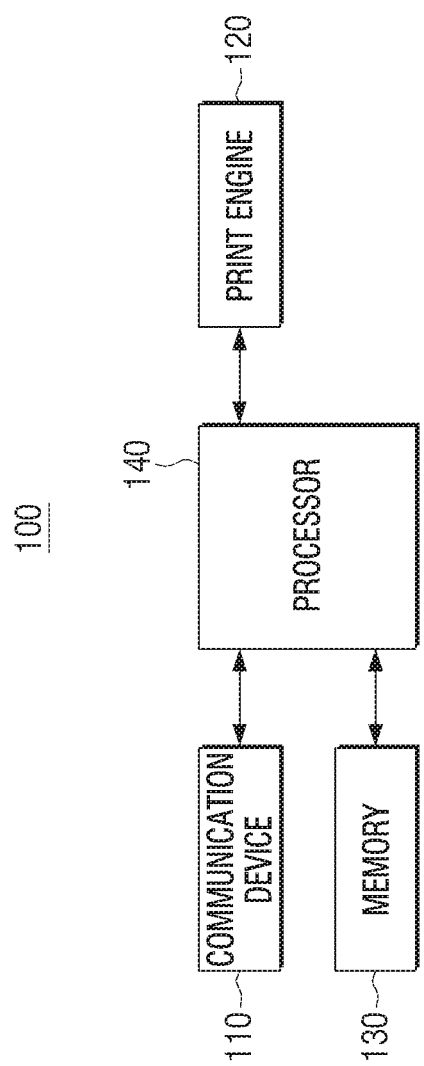
FIG. 2 is a block diagram of an image forming apparatus according to an example.

FIG. 2 is a block diagram of an image forming apparatus according to an example.

Referring to FIG. 2, an image forming apparatus 100 may include a communication device 110, a print engine 120, a memory 130, and a processor 140.

The communication device 110 may connect the image forming apparatus 100 to an external device. The communication device 110 may connect the image forming apparatus 100 to an external device via a local area network (LAN) and the Internet network as well as through a universal serial bus (USB) port, or a wireless communication (e.g., Wi-Fi 802.11a/b/g/n, near field communication (NFC), Bluetooth, etc.) port. The communication device 110 may be referred to as a transceiver.

The communication device 110 may receive a job performance command from an external device. The communication device 110 may transmit and receive data relating to the job performance command. For example, when a job command of a user is a command to print a particular file, the communication device 110 may receive print data.

The print data may be data of a printer language such as Postscript (PS), Printer Control Language (PCL), etc. When the image forming apparatus 100 supports a direct printing function, the print data may be a file itself such as PDF, XPS, BMP, JPG, etc.

The print engine 120 may form an image on a print medium using various printing methods such as an electrophotographic method, an inkjet method, a thermal transfer method, a direct thermal method, etc. For the electrophotographic method, the print engine 120 may include a photoconductor, a charger, an exposing device, a developing device, a transferring device, a fixing device, and the like.

The memory 130 may store print data received from an external device.

The memory 130 may store saturation information on the predetermined hue for each user. The saturation information on the predetermined hue may be information on the saturation when a user recognizes a color when the predetermined hue has each of a plurality of saturations. The saturation may have values from minimum 0 to maximum 100, wherein a higher value corresponds to a higher saturation, and a smaller value corresponds to a lower saturation. In addition, when the saturation is 0, it may mean achromatic color.

The saturation when the user can recognize a color may include a plurality of saturations, and the plurality of saturations for which the user can recognize the hue could be continuous. The saturation information on the predetermined hue may include information on the continuous saturation range.

For example, when a user is a trichromat (i.e., a person with normal vision) who can see all the colors, the user may recognize all colors regardless of saturation. Thus, the saturation information of the predetermined hue, for example, red color, may have an entire saturation range from 1 to 100.

However, in the case of a color-blind person who struggles with red-green color blindness, the user may not easily recognize red and green with a low saturation. Therefore, the color-blind person who struggles with red-green color blindness may recognize red only when the saturation is 20 or more. In this case, the saturation information on the predetermined hue (i.e., red) of the color-blind person who struggles with red-green color blindness may have the saturation ranging from 20 to 100.

In the above-described example, it is illustrated that the saturation information on the predetermined hue has all ranges of saturations that the user can recognize the predetermined hue, but it could refer to a saturation with a minimum value in the saturation range, and the disclosure is not limited thereto.

In addition, in the above-described example, it is exemplified that the predetermined hue is red, but the color could be various such as green or blue, or a plurality of colors.

The memory 130 may store vision information for each user. The vision information may be information of a user's ability to perceive details when viewing a still object. The vision information may include at least one vision information of the left eye or the right eye, or of the average value of the vision of both eyes.

The processor 140 may control a configuration of the image forming apparatus 100. The processor 140 may consist of a single device such as a central processing unit (CPU), or a plurality of apparatuses such as a clock generation circuit, a CPU, a graphic processor, etc.

The processor 140 may control the print engine 120 to print the received print data. The processor 140 may correct the color of the received print data. An example operation of correcting the received print data will be described below.

The processor 140 may identify a user corresponding to the received print data. The processor 140 may identify a user for the received print data using the user information received together with the print data from an external device. The user information may refer to information for a user account (e.g., an ID, a password, etc.). In addition, the user information may include a token assigned per user account.

The processor 140 may correct the color of the received print data by reflecting the saturation information on the predetermined hue of the identified user.

The processor 140 may correct a CMYK value of the print data such that the predetermined hue of the received print data has a saturation at which the identified user can recognize the hue by using the saturation information for the identified user among the saturation information on the predetermined hue for each user stored in the memory 130.

For example, when the saturation of red that the identified user (user A) can recognize has a saturation value from 30 to 100, the processor 140 may correct a CMYK value of the print data such that red of the print data may have a saturation from 30 to 100.

The processor 140 may correct the CMYK value corresponding to the predetermined hue among the CMYK values of the print data using the saturation information of the identified user.

For example, when the predetermined hue has at least one of RED, GREEN, or BLUE, the processor 140 may correct the values of M (MAGENTA) and Y (YELLOW) of print data using the saturation information on RED, the values of C (CYAN) and Y (YELLOW) of print data using the saturation information on GREEN, and the values of C (CYAN) and M (MAGENTA) of print data using the saturation information on BLUE.

The processor 140 may identify a minimum value of the saturation at which the identified user can recognize a predetermined hue using the saturation information of the identified user, and correct the CMYK value of print data using the CMYK correction value corresponding to the predetermined hue and the identified minimum value. An example operation will be described with reference to FIG. 8.

The processor 140 may correct the color of the received print data additionally considering the vision information of the identified user and the apparatus information of the image forming apparatus 100. An example operation will be described with reference to FIG. 8.

The processor 140 may receive additional correction information on at least one of C (CYAN), M (MAGENTA), Y (YELLOW) and K (BLACK) from the external device in addition to the saturation information, the vision information, and the apparatus information of the image forming apparatus stored in the memory 130, and correct the color of the print data by additionally reflecting the received additional correction information. An example operation will be described with reference to FIG. 9 and FIG. 10.

The processor 140 may control the print engine to print the corrected print data.

As described above, an example image forming apparatus has been illustrated and described. However, in other example implementations, various configurations may be further added. An example thereof will be provided with reference to FIG. 3.

Figure 3:
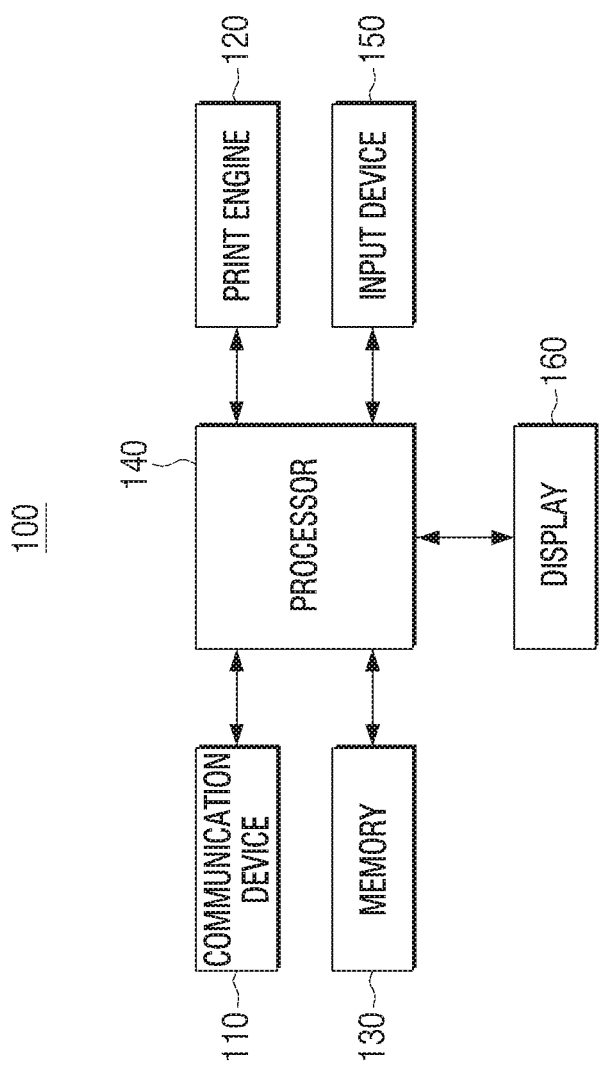
FIG. 3 is a block diagram of an image forming apparatus according to an example.

FIG. 3 is a block diagram of an image forming apparatus according to an example.

Referring to FIG. 3, an image forming apparatus 100 may include a communication device 110, a print engine 120, a memory 130, a processor 140, an input device 150, and a display 160.

The communication device 110, the print engine 120, and the memory 130 may perform the same functions as the configurations of FIG. 2, and thus a repeated description will be omitted. The processor 140 is also described with reference to FIG. 2, and the contents described in FIG. 2 will not be again described. Rather, contents related to the example of FIG. 3 will be described below.

The input device 150 may receive a function selection and a function control command from the user. Examples of the function may include a print function, a copy function, a scan function, a fax transmission function, and the like. Such a function control command may be input through a control menu displayed on the display 160. The input device 150 may include a keyboard, a mouse, a touch pad, a touch screen, or the like.

The input device 150 may receive a request for color correction of the print data received from the user. When receiving a request for color correction from the user, the processor 140 may correct the color of the print data using the saturation information on the predetermined hue of the user.

When the image forming apparatus 100 performs a vision test operation of the electronic apparatus 200, the input device 150 may receive information as to whether the user can recognize the predetermined hue during the vision test. The processor 140 may generate the saturation information on the predetermined hue using the vision test result. An example operation will be described with reference to FIG. 5 and FIG. 7.

The display 160 may display various information provided from the image forming apparatus 100. The display 160 may display a user interface window for selecting various functions provided from the image forming apparatus 100. For example, the display 160 may display a user interface window for receiving a selection of the function of the image forming apparatus and an option corresponding to each function.

The display 160 may display a user interface window for receiving a request for performing color correction of the received print data.

When the image forming apparatus 100 performs the vision test of the electronic apparatus 200, the display 160 may display a user interface window for performing the vision test. An example will be described with reference to FIG. 5.

The image forming apparatus 100 may identify a user corresponding to the received print data, and correct the print data using the saturation information on the predetermined hue of the identified user, thereby providing a print function more appropriate for the user's vision characteristic.

For example, although both User A and User B are both color-blind people who struggle with red-green color blindness, the degree of color blindness could be different. For example, User A may be vulnerable to the red-green color blindness, while User B may be less vulnerable to the red-green color blindness, in which case User A and User B may recognize red or green with different saturations.

Therefore, when correcting print data of each of User A and User B collectively in the same color correcting method (e.g., increasing saturations of red or green), User B may clearly distinguish the color of the corrected print data, but User A may not distinguish the color of the corrected print data.

Therefore, if print data is corrected using the saturation information on the predetermined hue for each user as the image forming apparatus 100, the user may easily distinguish the color of the corrected print data.

Figure 4:
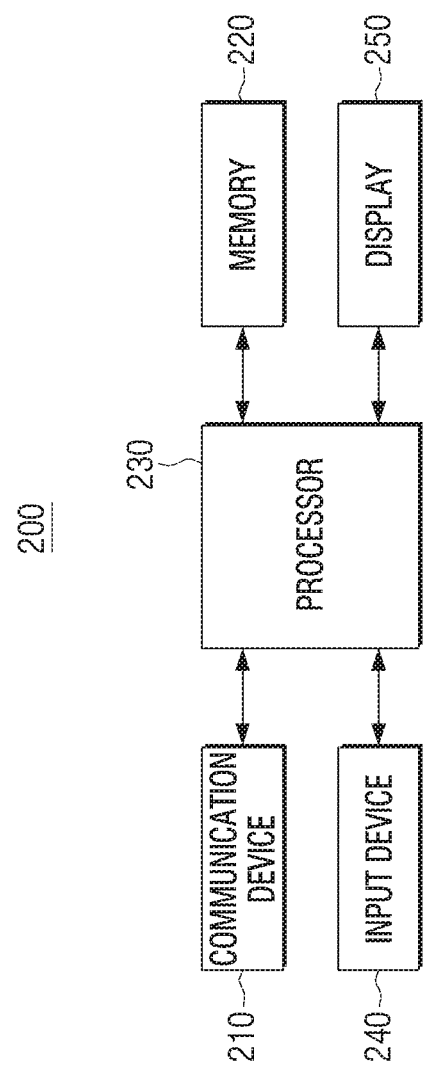
FIG. 4 is a block diagram of an electronic apparatus according to an example.

FIG. 4 is a block diagram of an electronic apparatus according to an example.

Referring to FIG. 4, an electronic apparatus 200 may include a communication device 210, a memory 220, a processor 230, an input device 240, and a display 250.

The electronic device 200 may include a portable terminal or a fixed terminal. The portable terminal may be an electronic device such as a video phone, a mobile phone, a smart phone, a portable computer (e.g., a notebook, a tablet, etc.), or the like. The fixed terminal may be a desktop personal computer, a smart TV, or the like. However, the electronic device 200 is not limited to the above-described examples.

The communication device 210 may be formed to connect the electronic device 200 with an external device and may connect the electronic device 200 with an external device via a LAN and the Internet network as well as a USB port or a wireless communication (e.g., WiFi 802.11a/b/g/n, NFC, Bluetooth, etc.) port. The communication device 210 may also be referred to as a transceiver.

In an example, the communication device 210 may transmit print data to the image forming apparatus 100. In an example, the communication device 210 may transmit the color corrected print data to the image forming apparatus 100.

The communication device 210 may transmit the vision test result of the vision test application stored in the memory 220 to the image forming apparatus 100 or the server 300.

The memory 220 may store a color vision test application for performing a color vision test for the user. The color vision test application may test whether the user can recognize a predetermined hue. The color vision test application may also test whether the user can recognize the hue with a plurality of saturations ranging from a low saturation to a high saturation.

The color vision test application may test not only whether the predetermined hue can be recognized, but also whether the plurality of saturations of the predetermined hue can be recognized. Therefore, the degree of color blindness for a specific color may be additionally tested.

The predetermined hue may include one or a plurality of colors. In an example, if the predetermined hue has a plurality of colors, the color vision test application may test whether each of the plurality of colors can be recognized with respect to a plurality of saturations.

The memory 220 may store a color vision test result obtained through the color vision test application. The processor 230 may generate saturation information on the predetermined hue using the color vision test result. The description of the predetermined hue has been made with reference to the operation of the image forming apparatus 100, and thus a repeated description will be omitted.

The memory 220 may store saturation information on the generated predetermined hue. When the color vision test is performed for a plurality of users, the memory 220 may store the saturation information for a predetermined hue for each of the plurality of users.

The processor 230 may control the electronic apparatus 200. The processor 230 may consist of a single device such as a CPU, or a plurality of devices such as a clock generation circuit, a CPU, a graphic processor, etc.

The processor 230 may perform a color vision test for a user using the color vision test application. The processor 230 may test whether the user can recognize the predetermined hue for each of the plurality of saturations. The processor 230 may store the color vision test result in the memory 220. An example operation of performing a color vision test will be described with reference to FIG. 5.

The processor 230 may generate saturation information on the predetermined hue using the color vision test result. For example, when the predetermined hue is RGB color, the processor 230 may generate information on the saturation that the user can recognize for each of RED, GREEN, and BLUE.

The processor 230 may correct the color of the print data using the saturation information on the predetermined hue.

The processor 230 may correct a CMYK value of print data such that the predetermined hue of the print data may have the saturation at which the user can recognize the hue by using the saturation information on the predetermined hue.

In an example, the method of the processor 230 for correcting a CMYK value of print data may be the same as the method of the processor 140 of FIG. 2 for correcting a CMYK value of print data. 2. Therefore, a redundant description will be omitted.

The processor 230 may transmit print data to the image forming apparatus 100. The processor 230 may correct the print data when requested for color correction from a user, and transmit the corrected print data to the image forming apparatus 100. When the saturation information on the predetermined hue for each user is stored in the image forming apparatus 100, the processor 230 may transmit the non-corrected print data together with user information and request for color correction. The processor 230 may transmit the non-corrected print data to the image forming apparatus 100 when not requested for color correction.

The input device 240 may receive a function selection and a function control command from the user. In an example, the function control command may be input through a control menu displayed on the display 250. The input device 240 may include a keyboard, a mouse, a touch pad, a touch screen, or the like.

The input device 240 may receive an input of whether the predetermined hue can be recognized from the user during the color vision test. The processor 230 may generate a color vision test result based on the input value.

The input device 240 may receive an additional correction value for each color of CMYK color from the user. The processor 230 may correct print data by additionally reflecting the input additional correction value. An example description will be made with reference to FIG. 9 and FIG. 10.

The display 250 may display various information provided from the electronic apparatus 200. For example, the display 250 may display a user interface window for selecting various functions provided from the electronic apparatus 200.

The display 250 may display a user interface window for performing a color vision test.

The electronic apparatus 200 may test whether the user can recognize a predetermined hue with respect to a plurality of saturations, generate saturation information on the predetermined hue including information on the saturation when the user recognizes the predetermined hue, and correct print data using the generated saturation information, thereby providing a print function appropriate for a user's visional characteristic.

FIG. 4 illustrates and describes the above-described configurations, but in other examples, various configurations could be additionally provided.

FIG. 4 illustrates and describes that the electronic apparatus 200 performs a vision test or generates information on the saturation at which the user can recognize a predetermined hue, but in other examples, the image forming apparatus 100 may perform a vision test, or the server 300 may receive a color vision test result, and generate information on the saturation at which the user can recognize a predetermined hue.

Figure 5:
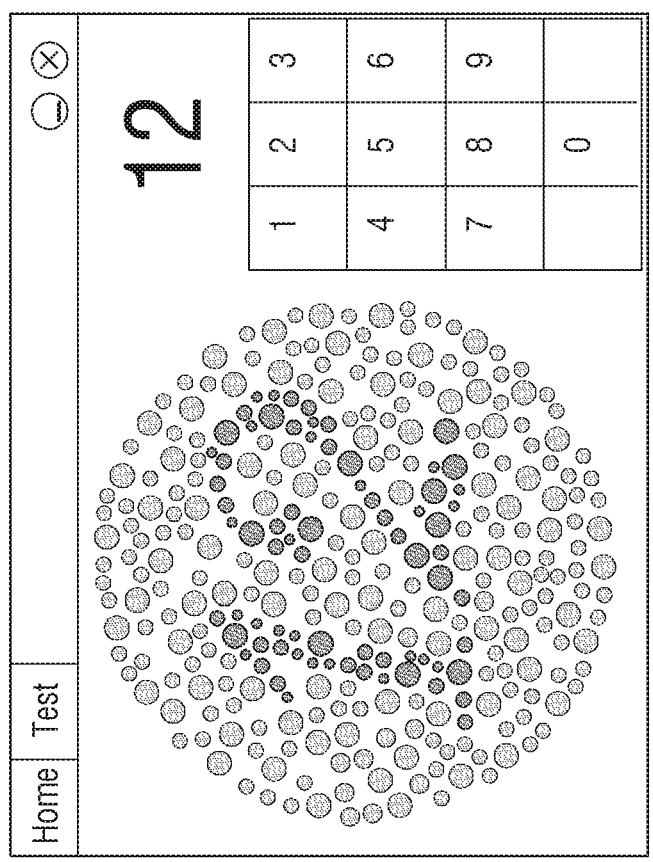
FIG. 5 is a view illustrating a user interface for performing a color vision test according to an example.

FIG. 5 is a view illustrating a user interface for performing a color vision test according to an example.

The processor 140 of the image forming apparatus 100 or the processor 230 of the electronic apparatus 200 may test whether the user can recognize a predetermined hue using a color vision test application.

Referring to FIG. 5, a test image including a background having a first color and a numerical figure having a second color may be provided on one area of a user interface screen, and a keypad for receiving a numerical figure may be provided on another area of the user interface screen.

The second color may be a predetermined hue for identifying whether the user can recognize the hue. The first color may be different from the second color, and be a complementary color of the second color, but is not limited thereto. It will be enough as long as the combination with the first color and second color can distinguish between a trichromat (i.e., a person with normal vision) and a color-blind person. In addition, the combination of the first color and the second color may be a combination using the Ishihara color blindness check table.

The processors 140 and 230 may receive a figure corresponding to the displayed test image from the user through the keypad. The processors 140 and 230 may identify whether the user can recognize a predetermined hue based on whether the displayed test image figure coincides with the input figure.

The color vision test application may provide a plurality of test images for the predetermined hue for accuracy of the color vision test. The processors 140 and 230 may identify whether the user can recognize the predetermined hue based on a coincidence ratio between the figures of the test images for the predetermined hue and the input figures.

Referring to FIG. 5, it is illustrated and described that only a single color can be recognized in one screen. However, in other examples, the test images on a plurality of colors may be provided on one screen, and it is tested whether each of the plurality of colors can be recognized.

FIG. 5 illustrates and describes receiving figures corresponding to the test images from the user through the keypad. However, in other examples, a voice of the user that utters the figure corresponding to the test image may be input through a microphone (not shown), and voice recognition may be performed with respect to the input voice to perform a color vision test.

The color vision test application may test whether the predetermined hue can be recognized, and whether the predetermined hue can be recognized for each of a plurality of saturations.

Figure 6A:
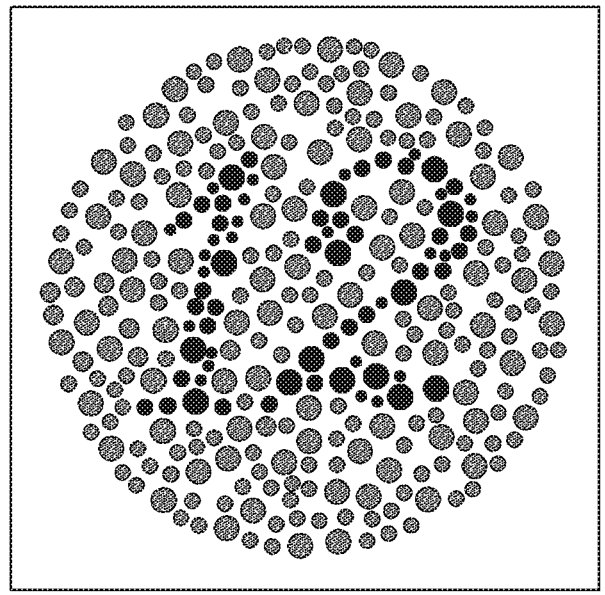
FIG. 6A is a view illustrating a test image for a predetermined hue having a first saturation according to an example.

FIG. 6A is a view illustrating a test image for a predetermined hue having a first saturation according to an example.

Referring to FIG. 6A, a color vision test application may identify a saturation when the user cannot recognize a color by using a test image having a plurality of saturations.

As an example, it may be relatively easy for a color-blind person to distinguish colors with a high saturation, but may be difficult to distinguish colors with a low saturation. Therefore, a color vision test application may sequentially provide images from a test image having a high saturation to a test image having a low saturation with respect to a predetermined hue, and test whether the user can recognize the hue of each test image to thereby identify the recognizable saturation of the predetermined hue.

For example, as illustrated in FIG. 6A, the color vision test application may display the test image of a background having the first color of the first saturation and a figure having the second color of the first saturation. The first saturation may have a high saturation value.

The trichromat may recognize all colors regardless of saturation, and recognize that the figure corresponding to the test image of FIG. 6A is 12. In addition, the color-blind person who is relatively less vulnerable to color blindness may recognize a predetermined hue because the first saturation is a high saturation, and thus recognize that the figure corresponding the test image of FIG. 6A is 12.

However, a color-blind person who is relatively vulnerable to color blindness cannot easily distinguish colors even in a test image with a high saturation, and thus may not recognize that the figure corresponding to the test image of FIG. 6A is 12.

The processors 140 and 230 may generate saturation information on the predetermined hue using the test result. As an example, the processors 140 and 230 may generate saturation information including the first saturation at which the trichromat and the color-blind person who is relatively less vulnerable to color blindness can recognize the predetermined hue.

Figure 6B:
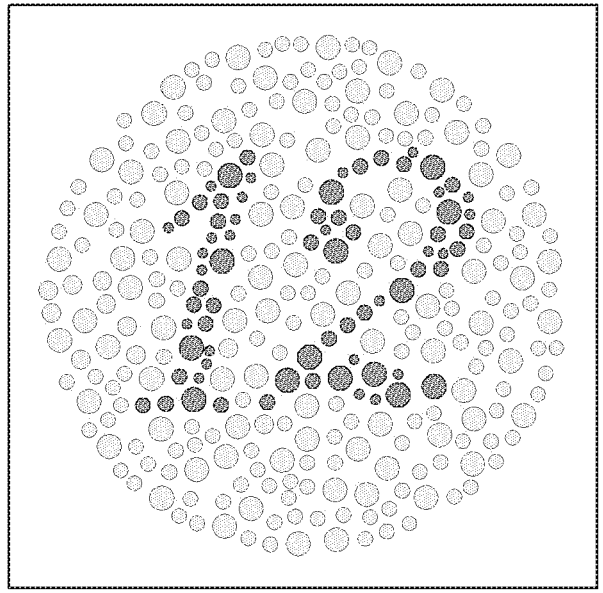
FIG. 6B is a view illustrating a test image for a predetermined hue having a second saturation according to an example.

FIG. 6B is a view illustrating a test image for a predetermined hue having a second saturation according to an example.

Referring to FIG. 6B, the color vision test application may display the test image including the background having the first color of the second saturation and the figure having the second color of the second saturation. The second saturation may have a low saturation value.

The trichromat may recognize all colors regardless of saturation, and thus may recognize the figure corresponding to the test image of FIG. 6B is 12.

However, a color-blind person who is relatively less vulnerable to color blindness may not recognize the predetermined hue because the second saturation is a low saturation, and thus may not recognize that the figure corresponding to the test image of FIG. 6B is 12. In addition, the color-blind person who is relatively vulnerable to color blindness may not recognize the figure.

The processors 140 and 230 may generate saturation information on the predetermined hue using the above-described test result. As an example, the processors 140 and 230 may generate saturation information including the second saturation as the saturation at which the trichromat can recognize the predetermined hue.

For ease of explanation, FIG. 6A and FIG. 6B illustrate and describe two test images having the first saturation and the second saturation. However, in other examples, a method for performing a color vision test using test images having each of three or more saturations may be performed. For example, a color vision test may be performed using 10 test images having saturations of 10, 20, . . . , and 100.

FIG. 6A and 6B illustrate and describe sequentially displaying test images from a high saturation to a low saturation. However, this is only an example and in other examples, the test images may be displayed in a sequence opposite to that described. In various examples, the test images may be displayed in various ways.

FIG. 6A and 6B illustrate and describe that the first color and the second color included in each of the plurality of test images have the same saturation (e.g., the first saturation or the second saturation). However, in other examples, the first color and the second color may have different saturations. For example, the saturation of the first color included in each of the plurality of test images may be fixed, but only the saturation of the second color may be changed.

FIG. 5, FIG. 6A, and FIG. 6B illustrate and describe that the color vision test application tests whether the predetermined hue can be recognized. However, in other examples, the color vision test application may provide a test image for testing the vision of the user (e.g., Snellen's vision checklist), and a vision test of receiving the figure corresponding to the test image from the user may be further performed.

In this case, the processors 140 and 230 may generate vision information of the user based on the vision test result. The vision information may include at least one of vision information of the left eye, the right eye, or the average value of vision of both eyes.

FIG. 7 is a view illustrating saturation information on a predetermined hue for each user according to an example.

The processor 140 of the image forming apparatus 100 or the processor 230 of the electronic apparatus 200 may perform a color vision test using a color vision test application, and generate saturation information on a predetermined hue using a color vision test result.

Referring to FIG. 7, saturation information on the predetermined hue may include a user ID, a recognition score for each predetermined hue, a vision score, a model name of the image forming apparatus, and a color table number.

The user ID may be an identification of the user such as a user account ID in which the color vision test is performed.

The recognition score for each predetermined hue may be a value obtained by converting the ability of color recognition into the score by using the result of whether the user can recognize each predetermined hue with respect to each of the plurality of saturations.

If the user recognizes the predetermined hue with a low saturation, the recognition score may be converted into a high score. However, if the user recognizes only the predetermined hue with a high saturation, the recognition score may be converted into a low score.

As an example, the processors 140 and 230 may identify a saturation (x) with a minimum value among the saturations at which the user can recognize the predetermined hue, and convert a (100-x) value to the recognition score. In addition, when the predetermined hue is distinguished in all saturations, the recognition score can be converted to 100.

For example, if the user recognizes the predetermined hue in the saturation ranging between 20 to 100, but cannot recognize the hue in the saturation ranging between 0 and 20, the processors 140 and 230 may identify a saturation with a smallest value among the saturations at which the user can recognize the hue as 20, and convert 80 (=100-20) to the recognition score.

The method for generating a recognition score for each predetermined hue is not limited to the above-described example. In other examples, the saturation information on a predetermined hue may include information on the saturation of the minimum value in the range of the saturations at which the user can recognize the predetermined hue, instead of the recognition score for each predetermined hue.

The vision information may be information generated based on the vision test result on the user. The example of FIG. 7 illustrates that vision information is a single value. However, in other examples, the vision information may include information of the vision of the left eye and the right eye.

The model name of the image forming apparatus may refer to the model name of the image forming apparatus to which the user wants to apply color correction of print data. The image forming apparatus may have a different printing method depending on its model. In other words, when image forming apparatuses of different models each print the same print data, the color of the print could be different.

Therefore, when the color of the print data is corrected additionally considering the characteristic of each type of the image forming apparatus, color correction appropriate for the user's visional characteristic may become possible. For example, the processors 140 and 230 may correct the color of the print data using the CMYK correction value individually provided according to the model of the image forming apparatus.

The color table number may be a unique number of the CMYK correction value corresponding to the recognition score for each predetermined hue. The color table may refer to a table having information on the CMYK correction value corresponding to the recognition score for each predetermined hue.

The processors 140 and 230 may identify a corresponding CMYK correction value in the color table with reference to the color table number corresponding to the user ID, and correct the color of the print data using the identified CMYK correction value.

For example, referring to FIG. 7, User A may have the recognition score of 100 with respect to RED and GREEN, and have the recognition score of 50 with respect to BLUE. In addition, it may be identified that the number of the CMYK correction value corresponding to the recognition score for each predetermined hue is 5502.

Therefore, the processors 140 and 230 may correct the color of the print data using the CMYK correction value corresponding to 5502, which is the color table number of User A in the color table, when requested color correction of the print data from User A.

The color table may be stored in the image forming apparatus 100, the electronic apparatus 200, or the server 300.

In an example, a slightly different correcting method may be required for each model of image forming apparatus, and thus a different color table may be provided to each type model of the image forming apparatus.

Therefore, the processors 140 and 230 may identify a color table corresponding to the model name of the image forming apparatus, identify a corresponding CMYK correction value in the identified color table using the color table number, and correct the color of the print data using the identified CMYK correction value.

In illustration and description of FIG. 7, additional information may be further included other than the above-described information, and part of the information may be omitted. For example, the vision information, the model information of the image forming apparatus, and the color table number could be omitted according to an example.

FIG. 7 illustrates and describes that the image forming apparatus 100 or the electronic apparatus 200 generates saturation information on the predetermined hue. However, in other examples, the image forming apparatus 100 or the electrical apparatus 200 may transmit the color vision test result to the server 300, and the server 300 may generate saturation information on the predetermined hue.

FIG. 8 is a view illustrating color table information according to an example.

Referring to FIG. 8, color table information may include a recognition score for each predetermined hue, and a correction value for each of C (CYAN), M (MAGENTA), Y (YELLOW), and K (BLACK) corresponding to the vision information.

When the user can recognize the predetermined hue only at a specific saturation or more, the color table information may include a CMYK correction value corresponding to the specific saturation of the predetermined hue, that is, a CMYK correction value corresponding to the minimum value of the saturation at which the user can recognize the predetermined hue.

For example, when the user can recognize red only at the saturation of 20 or more, the user may not recognize red in the saturation between 1 and 20 included in the print data. Therefore, the user may recognize red without any difficulty if the color of the print data is corrected using the CMYK correction value, which increases the saturation of red of the print data by 20. Therefore, the color table information may be configured such that the CMYK correction value that increases the saturation of red by 20 may be mapped with the saturation of 20 of red.

As described in FIG. 7, the saturation information on the predetermined hue may include the recognition score of the predetermined hue. Therefore, the color table information may be configured to map the corresponding CMYK correction value with each recognition score.

Therefore, the color table may include a greater value of a CMYK correction value as the minimum value of the saturation at which the user can recognize the predetermined hue is greater (or, the lower the recognition score for each predetermined hue), and may include a smaller value of a CMYK correction value as the minimum value of the saturation at which the user can recognize the predetermined hue is smaller (or, the higher the recognition score for each predetermined hue).

In addition, the CMYK correction value of the color table may be mapped with the vision information as well as the minimum value of the saturation at which the user can recognize the predetermined hue (or, the recognition score of the predetermined hue).

As an example, the correction value of C (CYAN), M (MAGENTA), and Y (YELLOW) may be mapped with the minimum value of the saturation at which the user can recognize the predetermined hue, and the correction value of B (BLACK) may be mapped with the vision information.

The correction value of B (BLACK) corresponding to the vision information may have a higher value as vision is lower (i.e., weaker), and have a lower value as vision is higher (i.e., stronger). This is to increase the saturation of a print image to allow the user to clearly recognize the hue when the user's eyesight is poor.

The color table may be stored in the image forming apparatus 100 or the electronic apparatus 200, and used when the processors 140 and 230 perform color correction of the print data.

The color table may be stored in the server 300. In this case, the processors 140 and 230 may transmit the saturation information on the predetermined hue to the server 300, and the server 300 may identify a corresponding CMYK correction value using the color table and the received saturation information, and transmit the identified CMYK correction value to the image forming apparatus 100 or the electronic apparatus 200.

The processors 140 and 230 may correct the color of the print data using the CMYK correction value identified through the color table. As an example, the processors 140 and 230 may correct a CMYK correction value corresponding to the saturation information using the color table, and correct the color of the print data by adding the identified CMYK correction value to the CMYK value of the print data.

A method of correcting the color of the print data using the CMYK correction value is not limited to the above-described example. The CMYK correction value may be subtracted from or multiplied by the CMYK value of the print data, or the CMYK correction value may be obtained by an expression using the value of the saturation information on the predetermined hue.

FIG. 8 illustrates and describes that the color table information has the CMYK correction value corresponding to the recognition score for each predetermined hue and the vision information. However, in other examples, the color table information may have the CMYK correction value corresponding only to the recognition score for each predetermined hue.

Figure 9:
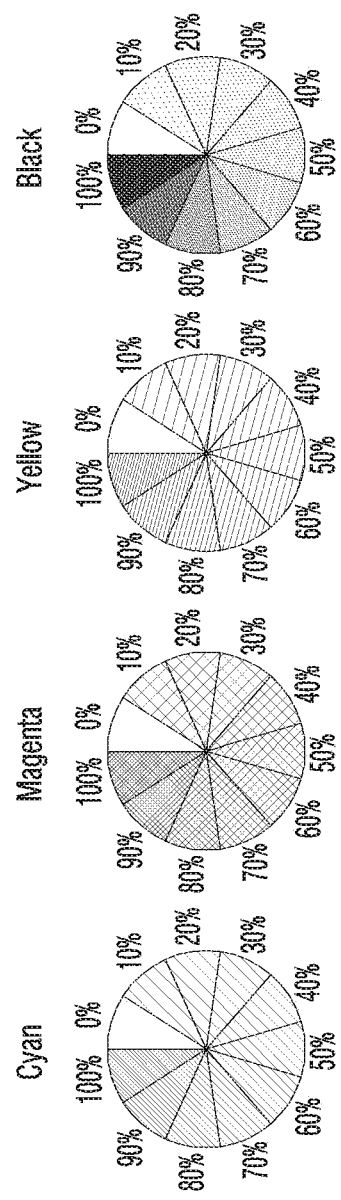
FIG. 9 is a view illustrating a sample image of cyan, magenta, yellow, and black (CMYK) color according to an example.
Figure 10:
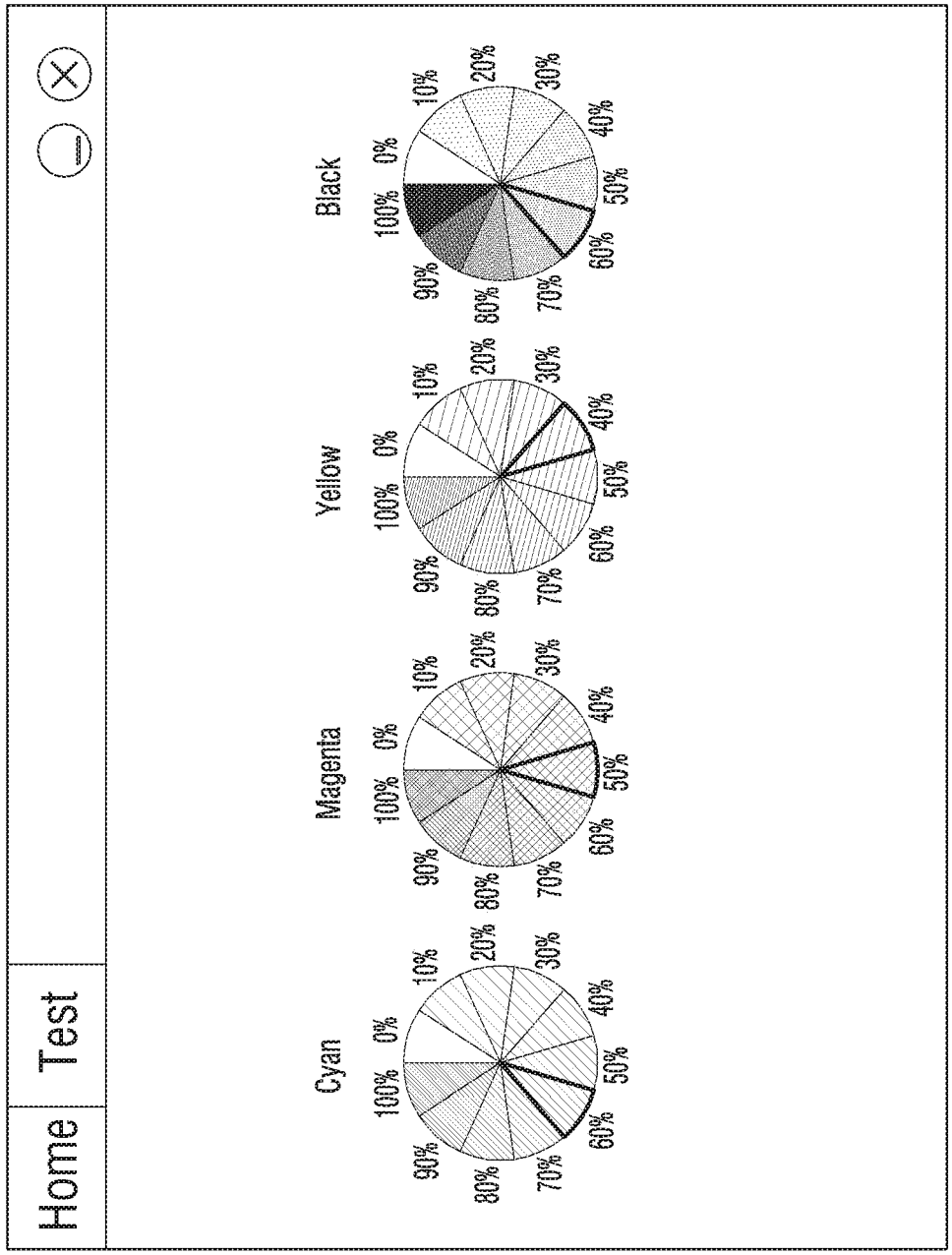
FIG. 10 is a view illustrating a user interface for receiving an additional correction value of CMYK color according to an example.

FIG. 9 and FIG. 10 are views to explain an additional correction method of CMYK color.

The processors 140 and 230 may correct print data using the saturation information on the predetermined hue. However, color discrepancy may occur between the color of the print data displayed on the displays 160 and 250 and the color of the print data output from the image forming apparatus. Such color discrepancy may occur due to the difference between the method of the display to display the image and the method of the image forming apparatus to output the image.

Due to the above-described color discrepancy, a user may recognize the color of the print data displayed on the display, but may not recognize part of the color of the print data output from the image forming apparatus.

Therefore, the processors 140 and 230 may perform an additional correction to eliminate the color discrepancy. Hereinafter, an example operation of an additional correction method for each CMYK color will be described.

FIG. 9 is a view illustrating a sample image of CMYK color according to an example.

Referring to FIG. 9, the processors 140 and 230 may display a sample image in saturations ranging from 1 to 100 with respect to each of C (CYAN), M (MAGENTA), Y (YELLOW), and K (BLACK). The sample images may be the color corrected simple image using the saturation information on the predetermined hue.

The processors 140 and 230 may print the sample image. As an example, the processor 140 may print the sample image by controlling the print engine 120, and the processor 230 may transmit the print data on the sample image to the image forming apparatus 100 and request printing.

The user may identify the print of the sample image output from the image forming apparatus 100.

FIG. 10 is a view illustrating a user interface for receiving an additional correction value of CMYK color according to an example.

Referring to FIG. 10, the user interface may display the same image as the output sample image, and one of the areas displayed with a plurality of saturations with respect to each CMYK color may be selected through the user interface.

The user may identify the area where each CMYK color clearly shows up in the output sample image.

The user may select an area corresponding to the area where each CMYK color is clearly showing up in the output sample image from the sample image displayed on the user interface.

For example, referring to FIG. 10, it can be seen that the user selects the area of saturation of 60 with respect to C (CYAN), the area of saturation of 50 with respect to M (MAGENTA), the area of saturation of 40 with respect to Y (YELLOW), and the area of saturation of 60 with respect to K (BLACK).

The processors 140 and 230 may generate additional correction information on the CMYK color based on the value input from the user. The processors 140 and 230 may identify the difference between the reference area of each CMYK color and the area selected by the user, and generate the additional correct information on CMYK color based on the identified difference. The reference area may be set based on the saturation information on the predetermined hue.

For example, the reference area of each CMYK color may be an area of the saturation of 50. When the area of the saturation of 60 is selected with respect to C (CYAN), it may mean that the user can recognize the color in the area with a higher saturation than the reference area. Therefore, the processors 140 and 230 may generate information on a CMYK additional correction value that increases the value of C (CYAN) to be higher.

For another example, when the area of saturation of 40 is selected with respect to Y (YELLOW), it may mean that the user can recognize the color in the area with a lower saturation that the reference area. Therefore, the processors 140 and 230 may generate information on a CMYK additional correction value that reduces the value of YELLOW to be lower.

The generated additional correction information may be stored in the image forming apparatus 100 or the memories 130 and 220 of the electronic apparatus 200, or transmitted to the server 300.

The processors 140 and 230 may correct the sample image again using the additional correction information, and repeat the additional correction method based on the sample image which is corrected again.

The processors 140 and 230 may correct the color of the print data using the saturation information and the additional correction information on the predetermined hue.

Figure 11:
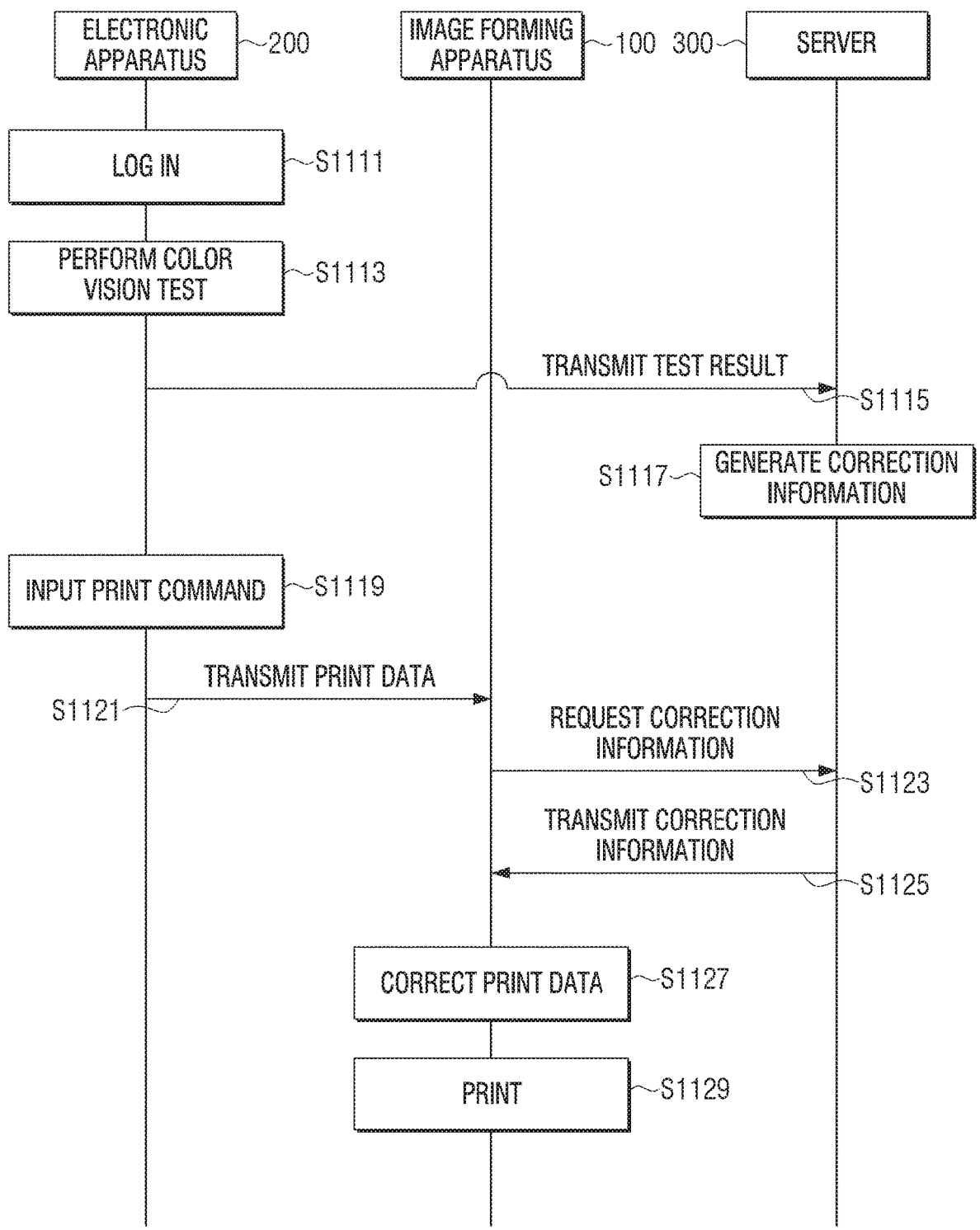
FIG. 11 is a sequence view of a color correction method according to an example.

FIG. 11 is a sequence view of a color correction method according to an example.

Referring to FIG. 11, a user may log into the electronic apparatus 200 at operation S1111. As an example, the user may log into the electronic apparatus 200 by inputting user account information (e.g., a user ID, a password, etc.).

The electronic apparatus 200 may perform a color vision test using a color vision test application at operation S1113. As an example, the electronic apparatus 200 may test whether a user can recognize a predetermined hue and whether a plurality of saturations of the predetermined hue can be recognized using the color vision test application. An example method for performing the color vision test has been described. Thus, a repeated description will be omitted.

The electronic apparatus 200 may transmit a color vision test result to the server 300 at operation S1115.

The server 300 may generate correction information using the received color vision test result at operation S1117. The server 300 may generate saturation information on the predetermined hue using the received color vision test result. The server 300 may generate correction information including a CMYK correction value corresponding to the saturation information on the predetermined hue using the color table.

The electronic apparatus 200 may receive a print command for the print data from the user at operation S1119. The electronic apparatus 20 may transmit the print data to the image forming apparatus 100 at operation S1121. The electronic apparatus 200 may transmit the user information (e.g., information on the user account) to the image forming apparatus 100.

The image forming apparatus 100 may transmit the user information to the server 300 and request correction information corresponding to the user information to the server 300 at operation S1123.

The server 300 may identify the corresponding correction information based on the received user information, and transmit the identified correction information to the image forming apparatus 100 at operation S1125.

The image forming apparatus 100 may correct the print data using the received correction information at operation S1127. The image forming apparatus 100 may correct the print data using the CMYK correction value included in the received correction information.

The image forming apparatus 100 may print the corrected print data at operation S1129.

Although the image forming apparatus 100 may not directly perform a color vision test for the user, the image forming apparatus 100 may receive the correction information corresponding to the user of the print data from the server 300 and correct the color of the print data to be appropriate for the user.

FIG. 11 illustrates and describes that an electronic apparatus performs a color vision test and transmits a test result to a server. However, in other examples, the image forming apparatus may perform a color vision test, and transmit a test result to the server.

FIG. 11 illustrates and describes that the image forming apparatus corrects the print data using the correction information. However, in other examples, the electronic apparatus may correct the print data using the correction information.

FIG. 11 illustrates and describes that the server generates saturation information on a predetermined hue based on the test result, and generates the correction information. However, in other examples, the image forming apparatus or the electronic apparatus may generate saturation information on the predetermined hue based on the test result and transmit the saturation information on the predetermined hue to the server. The image forming apparatus or the electronic apparatus may transmit user information and request transition of saturation information to the server, and the image forming apparatus may generate correction information using the received saturation information.

Figure 12:
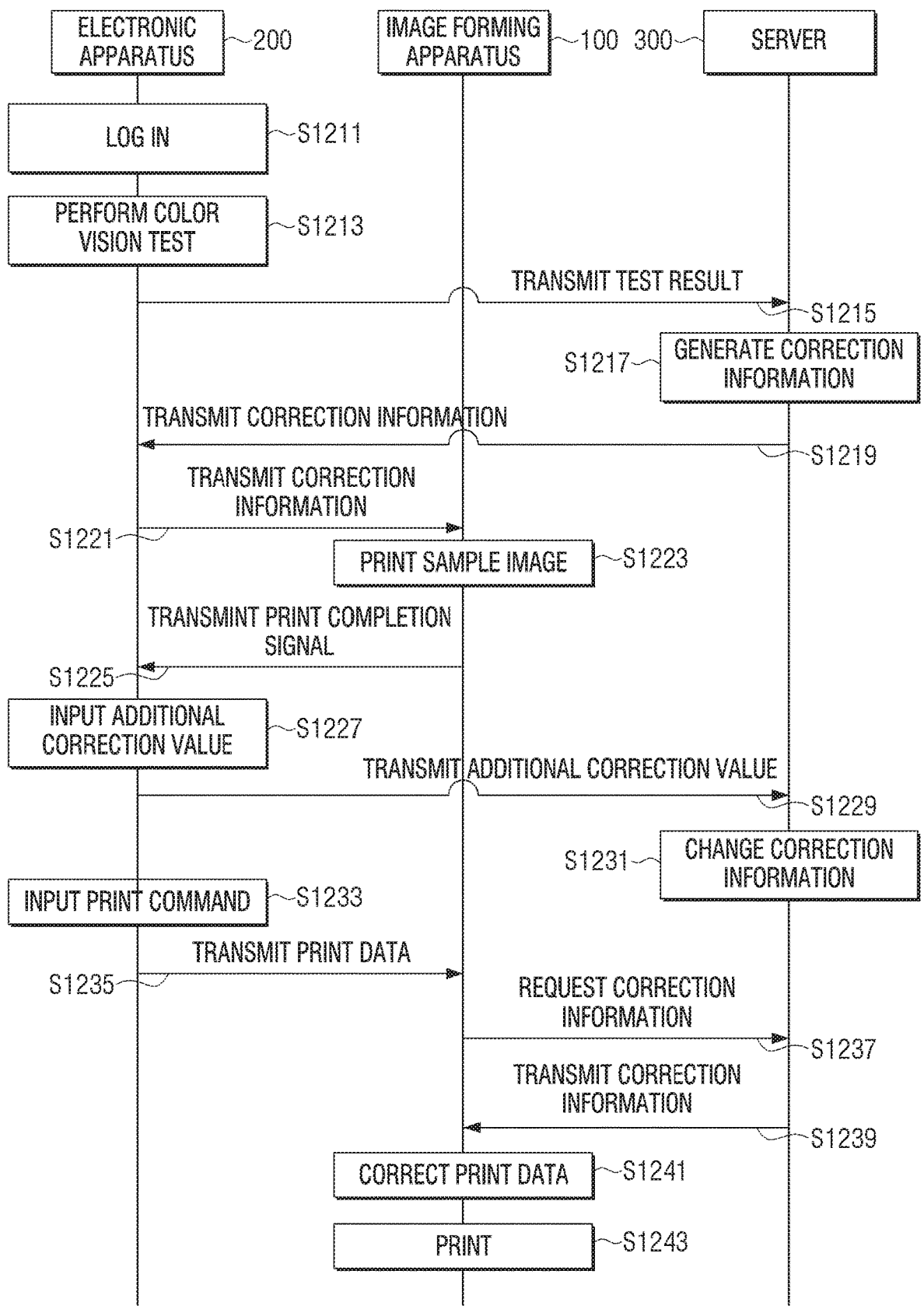
FIG. 12 is a sequence view of a color correction method according to an example.

FIG. 12 is a sequence view of a color correction method according to an example.

Referring to FIG. 12, a user may log into the electronic apparatus 200 at operation S1211. The user may log into the electronic apparatus 200 using user account information (e.g., a user ID, a password, etc.).

The electronic apparatus 200 may perform a color vision test for the user using a color vision test application at operation S1213. The electronic apparatus 200 may transmit the color vision test result to the server 300 at operation S1215.

The server 300 may generate correction information using the received color vision test result at operation S1217. As an example, the server 300 may generate the saturation information on the predetermined hue using the received color vision test result. In addition, the server 300 may generate the correction information including a CMYK correction value corresponding to the saturation information on the predetermined hue using the color table.

The server 300 may transmit the generated correction information to the electronic apparatus 200 at operation S1219. The electronic apparatus 200 may transmit a sample image with the received correction information to the image forming apparatus at operation S1221.

The image forming apparatus 100 may correct the print data using the received correction information and print the corrected sample image at operation S1223. As an example, the image forming apparatus 100 may correct the sample image having a plurality of saturations with respect to each CMYK color using the received correction information, and print the corrected sample image. The image forming apparatus 100 may transmit a print completion signal to the electronic apparatus 200 when the printing of the sample image is completed at operation S1225.

The electronic apparatus 200 may generate an additional correction value based on feedback of a user at operation S1227. The electronic apparatus 200 may display the corrected sample image, receive the selection of one area among the areas displayed with a plurality of saturations with respect to each CMYK color from the user, and generate an additional correction value using the information on the selected area. A description of an example operation has been made, and thus a repeated description will be omitted.

The electronic apparatus 200 may transmit the additional correction value to the server 300 at operation S1229. The electronic apparatus 200 may transmit the additional correction value together with the user information to the server 300.

The server 300 may change correction information at operation S1231. The server 300 may change the correction information corresponding to the received user information using the received additional correction value.

The electronic apparatus 200 may receive a print command for print data from the user at operation S1233. The electronic apparatus 200 may transmit the print data to the image forming apparatus 100 at operation S1235. The electronic apparatus 200 may transmit the user information (e.g. information on the user account) to the image forming apparatus 100.

The image forming apparatus 100 may transmit the user information to the server 300 and request correction information corresponding to the user information at operation S1237.

The server 300 may identify the corresponding correction information based on the received user information, and transmit the identified correction information to the image forming apparatus 100 at operation S1239.

The image forming apparatus 100 may correct the print data using the received correction information at operation S1241. As an example, the image forming apparatus 100 may correct the print data using the CMYK correction value included in the received correction information.

The image forming apparatus 100 may print the corrected print data at operation S1243.

FIG. 12 illustrates and describes an example in which the electronic apparatus performs a color vision test, transmits the test result to the server, generates the additional correction value, and transmits the additional correction value to the server. However, in other examples, the image forming apparatus may perform the above-described operations.

FIG. 12 illustrates and describes that the image forming apparatus corrects the print data using the correction information. However, in other examples, the electronic apparatus may correct the print data using the correction information.

FIG. 12 illustrates and describes that the server may generate saturation information on a predetermined hue based on the test result, generate the correction information, receive the additional correction value, and change the correction information. However, in other examples, the image forming apparatus or the electronic apparatus may generate the saturation information on the predetermined hue based on the test result, transmit the saturation information on the predetermined hue to the server, and the image forming apparatus or the electronic apparatus may request the transmission of the corresponding saturation information to the server while transmitting the user information. The image forming apparatus may generate the correction information using the received saturation information and change the correction information using the additional correction value.

Although the image forming apparatus 100 does not perform a color vision test for the user directly, the image forming apparatus 100 may receive the correction information corresponding to the user of the print data from the server 300 and correct the color of the print data to be appropriate for the user.

Figure 13:
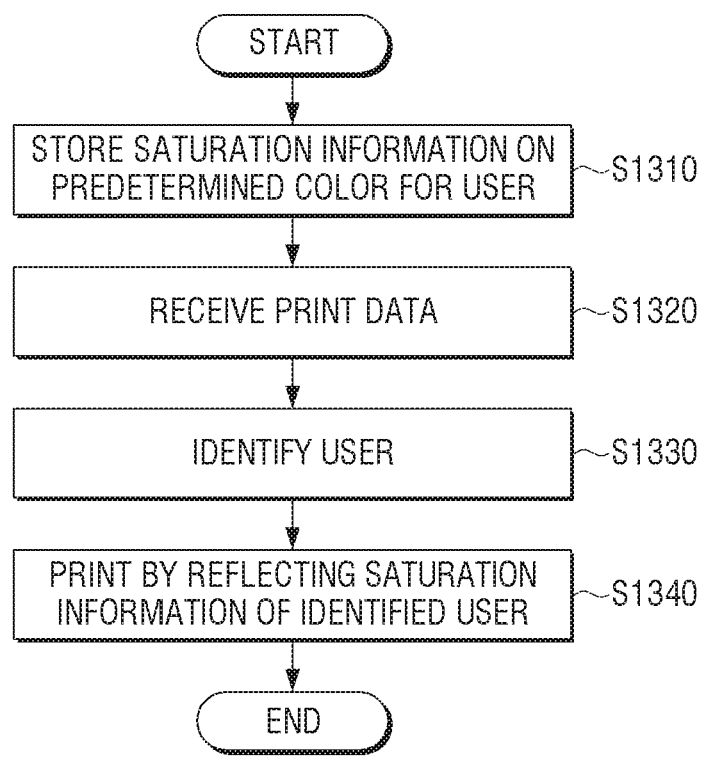
FIG. 13 is a flowchart of an image forming method according to an example.

FIG. 13 is a flowchart of an image forming method according to an example.

Referring to FIG. 13, saturation information on a predetermined hue for each user may be stored at operation S1310. The saturation information on the predetermined hue may be information on the saturation at which the user can recognize the predetermined hue with a plurality of saturations. The saturation may have a value ranging from 0 to 100, wherein a higher value corresponds to a higher the saturation, and a smaller value corresponds to a lower saturation. In addition, when the saturation is 0 (zero), it may mean achromatic color.

The saturation when the user recognizes the hue may have a plurality of saturations, and the plurality of saturations at which the user can recognize the hue may be continuous. Thus, the saturation information on the predetermined hue may include information on the continuous saturation range.

The predetermined hue may include at least one of R (RED), G (GREEN), or B (BLUE).

The print data may be received at operation S1320. The user information and the print data may be received from the external device.

The user corresponding to the print data may be identified at operation S1330. As an example, the user for the received print data may be identified using the user information received together with the print data from the external device. The user information may mean information on the user account (e.g., an ID, a password, etc.). In addition, a token assigned per user account may be included.

The print data may be printed by reflecting the saturation information of the identified user at operation S1340. By using the saturation information on the identified user among the saturation information on the stored predetermined hue for each user, the CMYK value of the print data may be corrected such at which the predetermined hue of the received print data may have the saturation that the user can recognize the hue.

In order for the predetermined hue of the received print data to have the saturation at which the user can recognize the hue, the value of CMYK color corresponding to the predetermined hue among CMYK values of the print data may be corrected using the saturation information of the identified user.

For example, the values of M (MAGENTA) and Y (YELLOW) of the print data may be corrected using the saturation information on RED, the values of C (CYAN) and Y (YELLOW) of the print data may be corrected using the saturation information on GREEN, and the values of C (CYAN) and M (MAGENTA) of the print data may be corrected using the saturation information on BLUE.

In order for the predetermined hue of the received print data to have a saturation at which the user can recognize the hue, the minimum value of the saturation at which the identified user can recognize the predetermined hue may be identified using the saturation information of the identified user, and the CMYK value of the print data may be corrected using the CMYK correction value corresponding to the identified minimum value.

The vision information for each user may be stored. The color of the print data may be corrected using the stored vision information and the saturation information.

At least one of the values of C (CYAN), M (MAGENTA), and Y (YELLOW) of the print data may be corrected using the saturation information, and the value of K (BLACK) of the print data may be corrected using the vision information.

The print data may be corrected by reflecting the saturation information and the apparatus information of the image forming apparatus. The print data may be corrected by using the CMYK correction value corresponding to the stored saturation information and the apparatus information of the image forming apparatus among CMYK correction values for each type of model of the image forming apparatus.

Additional correction information on at least one of C (CYAN), M (MAGENTA), Y (YELLOW), or K (BLACK) may be received from the external server, and print data may be corrected by additionally reflecting the received additional correction information.

Sample images having a plurality of saturation areas with respect to each of C (CYAN), M (MAGENTA), Y (YELLOW), and K (BLACK) may be printed, and the additional correction information generated by receiving the area where the color clearly is showing up based on the printed sample image may be received. The print data may be corrected by additionally reflecting the received additional correction information.

The corrected print data may be printed.

The image forming method according to the above-described example may include identifying a user corresponding to the received print data, and correcting the print data using the saturation information on the predetermined hue of the identified user. Therefore, a print function that is more appropriate for the user's visional characteristic may be provided.

The example method as shown in FIG. 13 may be executed in the image forming apparatus having the configuration of FIG. 2 or FIG. 3, or an image forming apparatus having another configuration.

As described above, the example image forming method may be embodied as at least one execution program for executing the above-described image forming method, and such execution program may be stored in a non-transitory computer readable medium.

A non-transitory computer readable medium refers to a medium that stores data semi-permanently, not a medium that stores data for a short period of time such as a register, a cache, a memory, etc., which is also readable by a device. In an example, the various applications or programs described above may be stored and provided on non-transitory computer readable medium such as a CD, a DVD, a hard disk, a Blu-ray disk, a USB, a memory card, a ROM, or the like.

Figure 14:
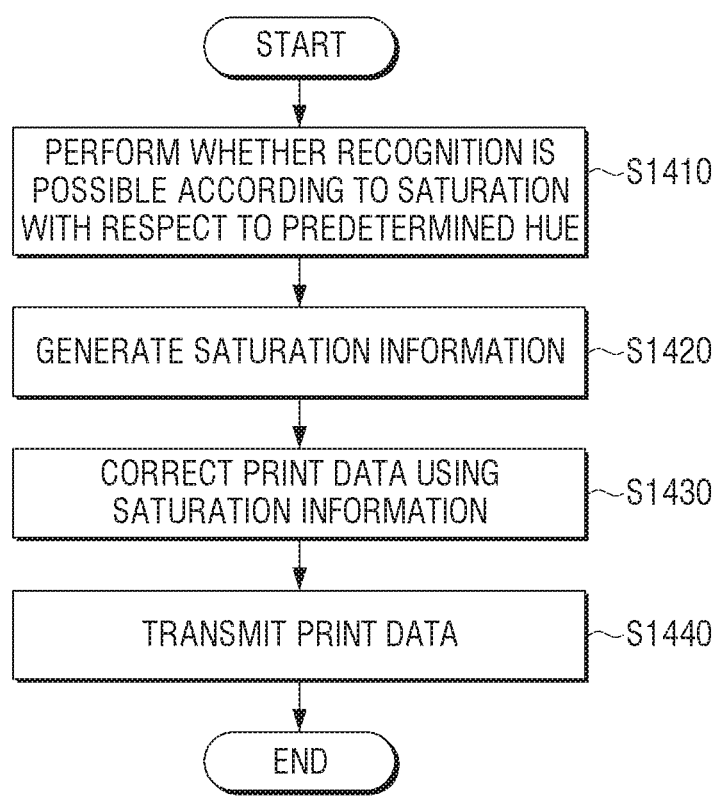
FIG. 14 is a flowchart of a print controlling method according to an example.

FIG. 14 is a flowchart of a print controlling method according to an example.

Referring to FIG. 14, whether a user can recognize a predetermined hue for each of a plurality of saturations may be tested at operation S1410. As an example, whether the user can recognize the predetermined hue for each of the plurality of saturations may be tested using a pre-stored color vision test application. The color vision test application may test whether the user can recognize the predetermined hue with a plurality of saturations from a low saturation to a high saturation.

Saturation information on the predetermined hue may be generated using the test result at operation S1420. The saturation information on the predetermined hue may be information on the saturation when the user can recognize the hue in the case it has a plurality of saturations.

The print data may be corrected by reflecting the saturation information at operation S1430. The CMYK value of the print data may be corrected such that the predetermined hue of the received print data may have the saturation at which the identified user can recognize the predetermined hue.

In order for the predetermined hue of the print data to have the saturation at which the user can recognize the hue, the value of CMYK color corresponding to the predetermined hue among the CMYK values of the print data may be corrected using the saturation information of the user.

For example, the values of M (MAGENTA) and Y (YELLOW) of print data may be corrected using the saturation information on RED, the values of C (CYAN) and Y (YELLOW) of print data may be corrected using the saturation information on GREEN, and the values of C (CYAN) and M (MAGENTA) of the print data may be corrected using the saturation information on BLUE.

In order for the predetermined hue of the print data to have the saturation at which the user can recognize the hue, the minimum value of the saturation at which the user can recognize the predetermined hue may be identified using the saturation information of the user, and the CMYK value of the print data may be corrected using the CMYK correction value corresponding to the identified minimum value.

The vision information for each user may be stored, and the color of the print data may be corrected using the stored vision information and saturation information.

At least one of the values of C (CYAN), M (MAGENTA), and Y (YELLOW) of the print data may be corrected using the saturation information, and the value of K (BLACK) of the print data may be corrected using the vision information.

The print data may be corrected by reflecting the saturation information and the apparatus information of the image forming apparatus. The print data may be corrected using the CMYK correction value corresponding to the saturation information of the user and the apparatus information of the image forming apparatus among CMYK correction values for each type model of the image forming apparatus.

A sample image having a plurality of saturation areas with respect to each of C (CYAN), M (MAGENTA), Y (YELLOW), and K (BLACK) may be printed, and the area where the color is clearly showing up based on the printed sample image may be received to generate the additional correction information. The print data may be corrected by additionally reflecting the generated additional correction information.

The corrected print data may be transmitted to the image forming apparatus at operation S1440.

As described above, a print controlling method according to an example may comprise testing whether a user can recognize a predetermined hue for each of a plurality of saturations, and correcting print data to have a saturation at which the user can recognize the predetermined hue based on the test result. Therefore, the print function more appropriate for the user's visual characteristic may be provided.

The example method as shown in FIG. 14 may be executed in an electronic apparatus having the configuration of FIG. 4, or an electronic apparatus having another configuration.

As described above, the image forming method may be embodied as at least one execution program for executing the above-described image forming method, and the execution program may be stored in a non-transitory computer readable medium.

Although examples have been shown and described, it will be appreciated by those skilled in the art that changes may be made to these examples without departing from the principles and spirit of the disclosure. Accordingly, the scope of the disclosure is not construed as being limited to the described examples, but is defined by the appended claims as well as equivalents thereto.

What is claimed is:

1. An image forming apparatus, comprising:
   a communication device to receive print data;
   a print engine to form an image;
   a memory to store information on a saturation that allows recognition of a predetermined hue for each user; and
   a processor to:
   identify a user corresponding to the received print data, and
   control the print engine to print the received print data based on saturation information of the identified user.

2. The apparatus as claimed in claim 1, wherein the processor corrects a cyan, magenta, yellow, black (CMYK) value of the print data to allow the predetermined hue of the print data to have a saturation at which the identified user recognizes the predetermined hue by using the saturation information of the identified user.

3. The apparatus as claimed in claim 2, wherein the processor identifies a minimum value of the saturation at which the identified user recognizes the predetermined hue by using the saturation information of the identified user, and corrects the CMYK value of the print data using a CMYK correction value corresponding to the identified minimum value.

4. The apparatus as claimed in claim 2,
   wherein the predetermined hue is at least one of R (RED), G (GREEN) or B (BLUE), and
   wherein the processor corrects values of M (MAGENTA) and Y (YELLOW) of the print data using saturation information on the R (RED) hue, corrects values of C (CYAN) and Y (YELLOW) of the print data using saturation information on the G (GREEN) hue, and corrects values of C (CYAN) and M (MAGENTA) of the print data using saturation information on the B (BLUE) hue.

5. The apparatus as claimed in claim 2, wherein the processor controls the print engine to print the print data by reflecting the saturation information of the identified user and apparatus information of the image forming apparatus.

6. The apparatus as claimed in claim 2,
   wherein the memory stores vision information for each user, and
   wherein the processor corrects at least one of a C (CYAN), a M (MAGENTA), or a Y (YELLOW) value of the print data using the saturation information, and corrects a B (BLACK) value of the print data using the vision information.

7. The apparatus as claimed in claim 1, wherein the processor receives additional correction information on at least one of a C (CYAN), a M (MAGENTA), a Y (YELLOW), or a K (BLACK) value from an external device and controls the print engine to print the print data by additionally reflecting the received additional correction information.

8. A print controlling method, the method comprising:
   testing whether a user recognizes a predetermined hue for each of a plurality of saturations;
   generating information on a saturation that allows recognition of the predetermined hue using a result of the testing;
   correcting print data by reflecting the information on the saturation; and
   transmitting the corrected print data to an image forming apparatus.

9. The method as claimed in claim 8, wherein the correcting comprises correcting a cyan, magenta, yellow, black (CMYK) value of the print data to allow the predetermined hue of the print data to have a saturation at which the user recognizes the predetermined hue by using the saturation information.

10. The method as claimed in claim 9, wherein the correcting comprises identifying a minimum value of the saturation at which the user recognizes the predetermined hue by using the saturation information, and correcting the CMYK value of the print data by using a CMYK correction value corresponding to the identified minimum value.

11. The method as claimed in claim 9,
    wherein the predetermined hue is at least one of R (RED), G (GREEN) or B (BLUE), and
    wherein the correcting comprises:
    correcting values of M (MAGENTA) and Y (YELLOW) of the print data using saturation information on the R (RED) hue,
    correcting values of C (CYAN) and Y (YELLOW) of the print data using saturation information on the G (GREEN) hue, and
    correcting values of C (CYAN) and M (MAGENTA) of the print data using saturation information on the B (BLUE) hue.

12. The method as claimed in claim 9, wherein the correcting comprises correcting the print data by reflecting the saturation information and apparatus information of the image forming apparatus.

13. The method as claimed in claim 9, further comprising:
    testing vision of the user and generating vision information of the user,
    wherein the correcting comprises correcting at least one of a C (CYAN), a M (MAGENTA), or a Y (YELLOW) value of the print data using the saturation information, and correcting a B (BLACK) value of the print data using the vision information.

14. The method as claimed in claim 8, further comprising:
    receiving an additional correction value on at least one of a C (CYAN), a M (MAGENTA), a Y (YELLOW), or a K (BLACK) value from the user, wherein the correcting comprises correcting the print data by additionally reflecting the received additional correction value.

15. A non-transitory computer readable recording medium including instructions to execute a print controlling method, non-transitory computer readable recording medium comprising:
- instructions to test whether a user recognizes a predetermined hue for each of a plurality of saturations;
- instructions to generate information on a saturation that allows recognition of the predetermined hue by using a result of the testing;
- instructions to correct print data by reflecting the saturation information; and
- instructions to transmit the corrected print data to an image forming apparatus.

* * * * *